No. 636,703. Patented Nov. 7, 1899.
M. J. ANDERSON.
AGRICULTURAL IMPLEMENT.
(Application filed Feb. 8, 1899.)
(No Model.) 2 Sheets—Sheet 1.
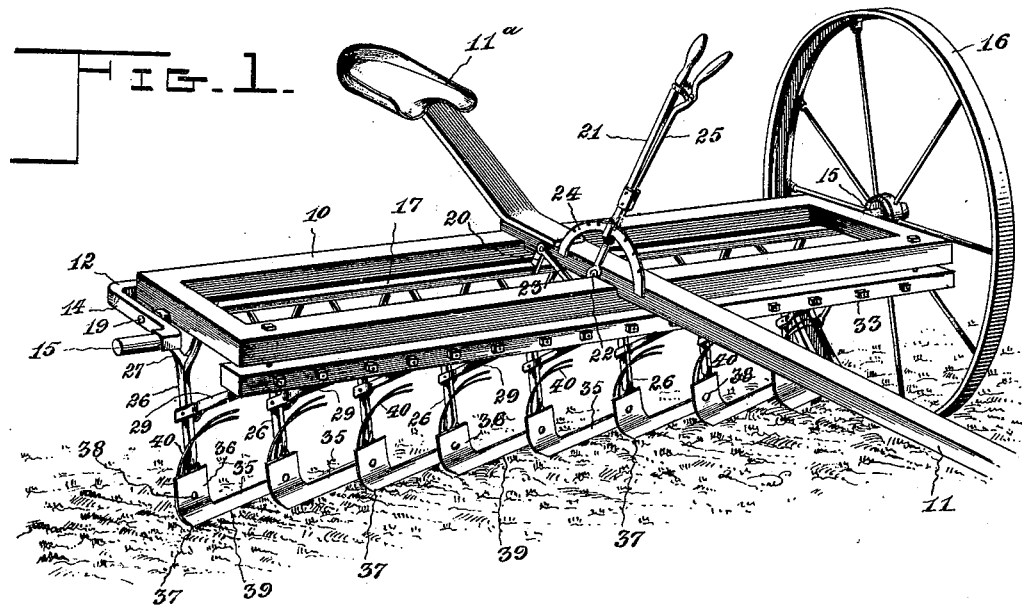
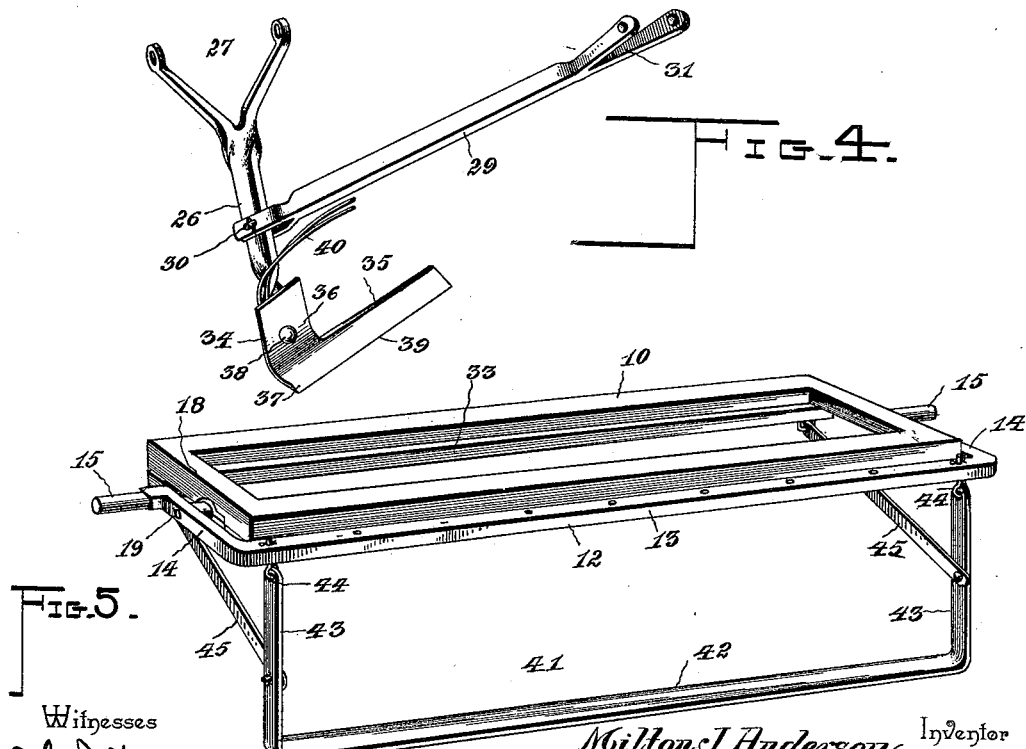
Witnesses Milton J. Anderson, Inventor
By his Attorneys, No. 636,703. Patented Nov. 7, 1899.
M. J. ANDERSON.
AGRICULTURAL IMPLEMENT.
(Application filed Feb. 8, 1899.)
(No Model.) 2 Sheets—Sheet 2.
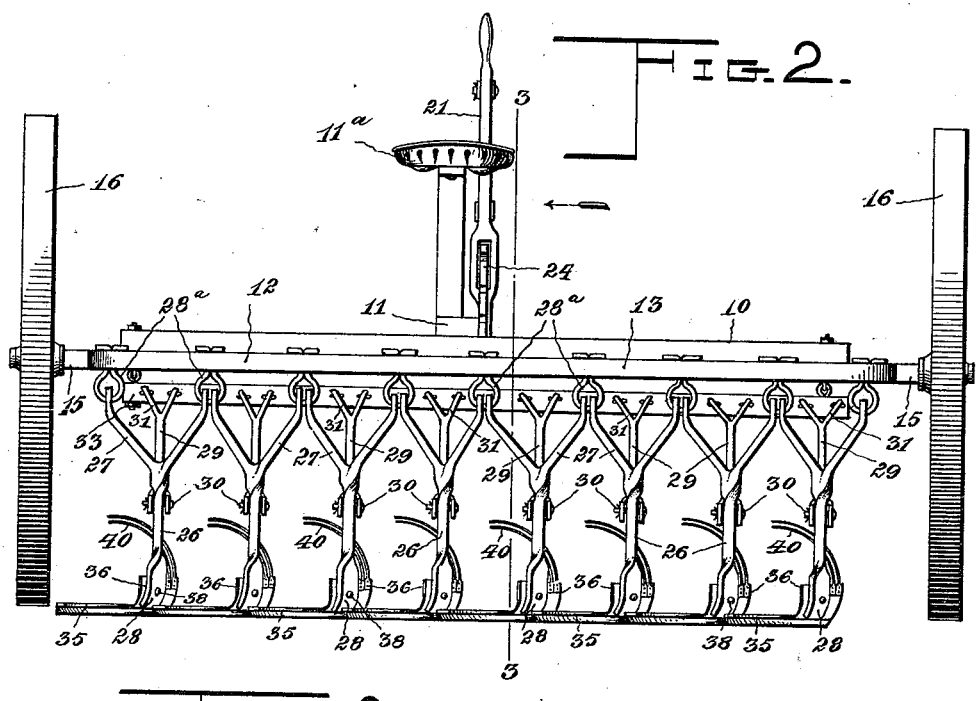
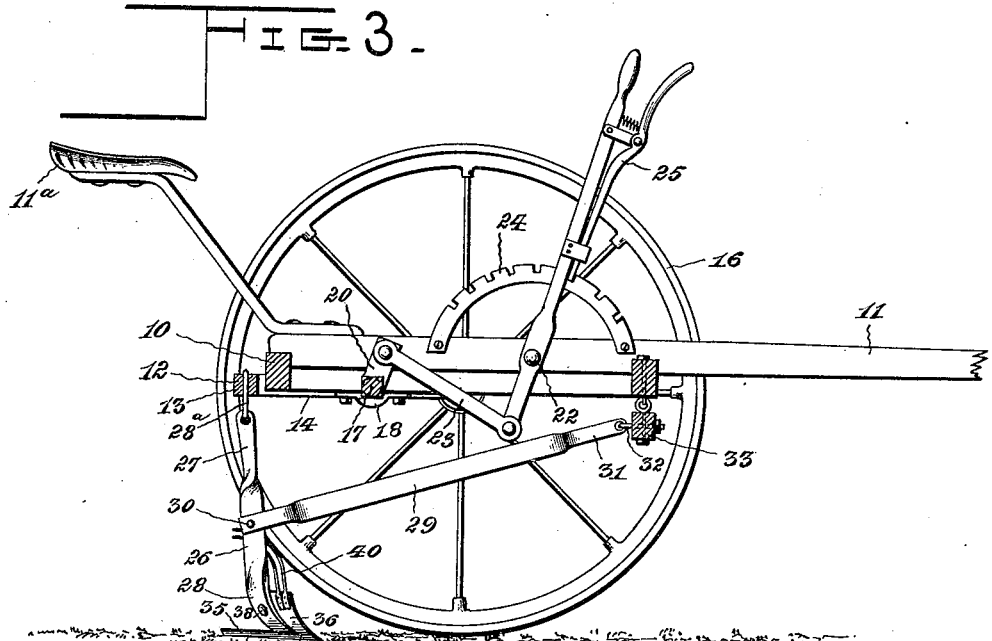
Witnesses  Milton J. Anderson, Inventor
By his Attorneys,

UNITED STATES PATENT OFFICE.

MILTON JOSEPH ANDERSON, OF DUFUR, OREGON, ASSIGNOR TO THE SUMMERS FALLOW MACHINE COMPANY, OF SAME PLACE.

AGRICULTURAL IMPLEMENT.

SPECIFICATION forming part of Letters Patent No. 636,703, dated November 7, 1899.

Application filed February 8, 1899. Serial No. 704,904. (No model.)

*To all whom it may concern:*

Be it known that I, MILTON JOSEPH ANDERSON, a citizen of the United States, residing at Dufur, in the county of Wasco and State of Oregon, have invented a new and useful Agricultural Implement, of which the following is a specification.

In the western section of the country, where farms have large area as a rule, it has been found desirable and profitable to plant about one-half the acreage in grain each year and allow the remaining acreage to rest or "summer-fallow," the fallow land being plowed in the winter or spring. The grain is sown in the fallow land in drills during the fall following its summer's rest, to secure a good start from the early rains, thus insuring growth to the grain during the winter season. The ground, after having been under cultivation for a few years, becomes overgrown and foul with rank weeds, which not only sap the energy from the soil to as great or a greater extent than a crop of grain, but if allowed to go to seed on the land have a tendency to injure the crop. To eradicate the weeds and other objectionable vegetable growths and to keep the summer-fallow land in a condition free from growths of weeds, it has been customary to second-plow the ground or to harrow it; but the common methods of treating the soil are far from satisfactory. Cultivating implements of various kinds have been employed for this purpose, and while they are reasonably satisfactory for garden-work or small farms, yet in a field of, say, from four to five hundred acres such machines are impracticable, because the shovels will cut off the weeds, which are free to lodge upon the machine-standards and clog the shovels, thus necessitating frequent stoppages of the machine to clean or clear away the obstructing weeds. Such drawbacks are not apparent in the ordinary usage of cultivators; but for a machine used especially for eradicating weeds, and drawn by a two-horse team or a four-horse team, the objections enumerated are fatal to the successful use of ordinary cultivators. While it is necessary to thoroughly eradicate and destroy the weeds in summer-fallow ground, it is not desirable to stir or turn up the ground in the weed-cutting operation.

It is the object of the present invention to provide a machine embodying means for thoroughly cutting the weeds with a minimum disturbance of soil, and, furthermore, to provide means arranged to deflect the cut weeds, so as to prevent entanglement thereof with the working parts of the machine.

A further object of the invention is to provide means by which the knives may be raised clear of the ground when traveling to or from the field, and said adjusting means may also be used to regulate the depth of penetration of the cutters.

To the attainment of the foregoing objects my invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a perspective view of the complete machine, which I prefer to designate as a "summer-fallow implement." Fig. 2 is a rear elevation. Fig. 3 is a vertical cross-section through the machine on a plane indicated by the dotted line 3 3, Fig. 2. Fig. 4 is a detailed perspective view of one of the knife-hangers and its drag-bar. Fig. 5 is a perspective view of a single knife-bar having a cutting edge which is substantially coextensive with the width of the machine.

Like numerals of reference denote like and corresponding parts in each of the several figures of the drawings.

10 designates the main frame, to which is firmly secured the draft-tongue 11, and on this frame is secured a standard which supports the driver's seat $11^a$.

To support the knives or cutters of my improved machine, I employ an adjustable frame 12, which in order to distinguish from the frame 10 will be hereinafter referred to as the "knife-frame." This knife-frame consists of the rear rail 13 and the side arms 14, and, as shown by the drawings, said frame may be bent from a single bar of metal, although the detailed construction of the frame is immaterial. The said arms of the knife-frame are bent to form or are provided with wheel-spindles 15, which extend outwardly beyond the sides of the implement and are adapted to receive the carrying-wheels 16, of any suitable construction. The knife-frame is thus mounted in the carrying-wheels for adjustment in a vertical direction, and this knife-frame and the main frame 10 are connected operatively together by an adjusting appliance for the purpose of raising or lowering the frame 12 and the devices carried thereby. As shown by the drawings, a rock-shaft 17 is arranged in a horizontal position lengthwise of the main frame 10, and this shaft is supported near its ends in the bearings 18, which are secured firmly to the under side of the main frame. The ends of said rock-shaft 17 are extended or prolonged beyond the end bars of the main frame 10, and said extended ends of the shaft are secured firmly, as at 19, to the side arms 14 of the knife-frame 12. The rock-shaft 17 is, furthermore, provided with a radial arm 20, which is fast with the shaft and is disposed in a position contiguous to the draft-tongue 11. On the draft-tongue is fulcrumed, as at 22, the operating-lever 21, the short arm of which is connected to a pitman 23, which in turn is pivoted to the arm 20 of the rock-shaft. The lever 21 is disposed adjacent to a notched segment 24, which is fixed on the draft-tongue or the carrying-frame 10, and on this lever is mounted a hand-latch 25, which is adjustable with the lever and is disposed to engage with the notched end of the segment 24.

Although I have specifically illustrated and described the means for adjusting the knife-frame with relation to the main frame, I do not desire to limit myself to this particular means for adjusting the knife-frame, as I am aware that a skilled constructor may provide equivalent adjusting devices for changing the position of the knife-frame with relation to the main frame.

In the preferred embodiment of the invention (represented by Figs. 1 to 4, inclusive) I employ a series of individual cutters or knives, which are arranged in positions oblique to the line of draft, and these knives or cutters are carried by a series of hangers 26. The hangers are suspended from the rear rail 13 of the knife-frame, and they are arranged substantially in alinement with each other transversely across the machine. Each hanger is forked or bifurcated at its upper end, as indicated by the numeral 27, and said forked end is connected by the links 28 with the rail 13 of the knife-frame. Near its lower end each hanger is twisted to form the foot 28, which is disposed obliquely to the line of draft, and to each hanger is connected a drag-bar 29, which serves to prevent rearward movement of the hanger and the knife which is supported thereby. The drag-bar 29 for each knife-hanger is pivoted by a pin 30 to the knife-hanger at a point below its forked upper end, thus permitting each hanger to have a limited play or movement on the knife-frame. The front end of the drag-bar is forked at 31 and connected by links 32 to a movable cross-rail 33, which is supported in any suitable way beneath the front rail of the main frame 10.

34 designates the series of knives which are attached individually to the oblique feet 28 on the knife-hangers, and each knife is thus caused to assume a position oblique to the line of draft and to the horizontal line of the ground. Each knife is made, preferably, from a single piece of metal to form the elongated blade 35 and a working face 36, said working face being the equivalent to the moldboard of an ordinary cultivator shovel or plow. The working face 36 and the knife-blade are so formed as to provide a point 37 to the inner end of the knife, and said knife is fastened to the foot 28 of the hanger by means of the bolt 38, although the specific fastening device is immaterial. The blade 35 of each knife has its front edge formed to produce a continuous cutting edge 39, and by making each blade quite long and by adjusting the blade in a position obliquely to the line of draft the free end of one blade extends in rear of the adjacent blade, as clearly represented by Figs. 1 and 2. The blades of the knives occupy nearly horizontal positions; but in order to present the cutting edge of each blade properly to the ground said blade is disposed in a slightly-inclined position from the point 37 to the heel of the blade, thus making the knives operate with maximum efficiency on the roots of the weeds.

To prevent entanglement of the cut weeds with the hangers of the implement, I provide each knife with a series of guard-fingers 40. Each knife may have two, three, or more of these guard-fingers, and, as shown by Fig. 4, the fingers are attached to the rear side of the knife and at the inner edge of the working face 36. The fingers are curved upward in front of the hanger and overhang the inclined blade 35, and said fingers are thus disposed in front of the knife-hanger, so as to deflect or throw the weeds over the blade and to one side of the hanger in a manner to entirely overcome any tendency of the weeds to lodge on the knife or against the hanger.

In the service of the implement the lever 21 is adjusted to raise the knife-frame, and thereby elevate the knives clear of the ground when the machine is driven too or from the field. To employ the machine for cutting weeds, the lever is operated to lower the knife-frame to a position where the knives will enter the ground for a depth not exceeding two inches, after which the locking-latch is engaged with the segment to hold the frame and the knives in their adjusted positions. In driving the machine across the field the knives penetrate the ground to cut the roots of the weeds below the surface, and the severed weeds are deflected by the guard-fingers over the knives and to one side of the hangers, thus discharging the weeds out of the path of the implement and permitting free progress thereof without obstruction from the weeds. It is evident that the lever may be adjusted to regulate the depth of penetration of the knives in the ground, and the knives are permitted to have a limited movement or play on the knife-frame owing to the loose connection of the hangers to the frame and the pivotal connection of the drag-bars to the hangers and the rock-shaft. At the same time the drag-bars obviate undue rearward movement of the hangers and knives when the latter penetrate the ground.

In Fig. 5 of the drawings I have represented another style of cutter which may be used in lieu of or interchangeably with the series of knives 34. This type of cutter consists of a single bar 41, having a cutting edge 42, which is nearly coextensive to the width of the machine, and said bar is provided with the arms 43, which are adapted to be fastened to the rail 13 of the knife-frame by means of the bolts 44. The bar is thus attached to the knife-frame in a position to present its cutting edge 42 to the ground, and said knife is stayed in its working position by braces 45, which are attached to the arms 43 of the knife-bar and to the rocking or adjustable cross-rail 33.

Changes in the form, proportion, size, and the minor details of construction within the scope of the appended claims may be resorted to without departing from the spirit or sacrificing any of the advantages of this invention.

What I claim is—

1. In an agricultural implement, substantially such as described, the combination with a main frame having a draft-tongue, of a knife-frame provided with the spindles, carrying-wheels fitted to said spindles, adjusting mechanism mounted on the main frame and connected operatively with the knife-frame, and a cutter mechanism supported by the knife-frame and adjustable therewith, as and for the purpose set forth.

2. In an agricultural implement, substantially such as described, the combination with a main frame, of a knife-frame provided with the carrying-wheels, a rock-shaft journaled on the main frame and secured firmly to the knife-frame within the wheel-spindles, a lever fulcrumed on the main frame and connected with the rock-shaft, a locking device for said lever, and a cutter mechanism suspended from and adjustable with the knife-frame, as set forth.

3. In an agricultural implement, substantially such as described, the combination with a knife-frame, of a series of hangers supported by said frame, and a series of knives attached to said hangers in positions oblique to the line of draft, and each having an extended cutting edge which lies in rear of an adjacent knife, as and for the purposes set forth.

4. In an agricultural implement, substantially such as described, the combination with a frame and a series of hangers supported thereby, of a series of knives disposed in inclined positions to the ground-line and to the line of draft, and each having a working face disposed in front of the hanger, and an elongated blade which extends laterally from the hanger and terminates in rear of an adjacent knife, as and for the purposes set forth.

5. In an agricultural implement of the class described, a plurality of closely-grouped knives arranged in overlapping order throughout the series and each lying obliquely to the line of draft, in combination with a frame, and means for suspending the knives from said frame, as and for the purposes set forth.

6. In an agricultural implement of the class described, a plurality of closely-grouped knives arranged obliquely to the line of draft and in overlapping order throughout the series, each knife having an elongated blade and a working surface which is extended upwardly from said blade at one end thereof, in combination with a frame, and hangers for suspending the knives from said frame, as and for the purposes set forth.

7. In an agricultural machine, substantially such as described, the combination with hangers, of a series of knives each fastened to one of said hangers and provided with a working face, and guard-fingers secured to each knife and curved upwardly in front of the hanger and over the cutting edge of the knife, as and for the purposes set forth.

8. In an agricultural machine, substantially such as described, the combination with a main frame and a wheeled knife-frame, of a movable cross-rail supported in the main frame, a series of hangers suspended from the knife-frame, and each carrying a knife or cutter, and drag-bars attached to the hangers and to the cross-rail, as and for the purposes set forth.

9. In an agricultural machine, substantially such as described, a hanger having the forked upper end and the twisted lower end forming a foot which lies oblique to the line of draft, a knife fastened securely to the foot and provided with a working face and with an elongated blade having an extended cutting edge, guard-fingers attached to the knife and curved in front of the hanger and over the blade, in combination with a knife-frame to which the hangers are fastened in series, a main frame, drag-bars between the hangers and the main frame, and an adjusting device supported on the main frame and connected operatively with the knife-frame, as and for the purposes set forth.

In testimony that I claim the foregoing as my own I have hereto affixed my signature in the presence of two witnesses.

MILTON JOSEPH ANDERSON.

Witnesses:
WILLIAM MARTEL PARKER,
ISAIAH J. BUTLER.